US006086256A

United States Patent [19]

Paschke et al.

[11] Patent Number: 6,086,256

[45] Date of Patent: Jul. 11, 2000

[54] TELESCOPIC JIB BEARING ASSEMBLY WITH EMBOSSMENTS

[75] Inventors: Franz Paschke, Sande; Kurt Vohdin, Zetel, both of Germany

[73] Assignee: Grove U.S. L.L.C., Shady Grove, Pa.

[21] Appl. No.: 09/209,750

[22] Filed: Dec. 11, 1998

[30] Foreign Application Priority Data

Dec. 12, 1997 [DE] Germany ........................... 197 55 355

[51] Int. Cl.[7] .......................... F16C 25/02; B66C 23/04; B66F 9/08

[52] U.S. Cl. ............................... 384/35; 52/118; 212/350

[58] Field of Search ................................ 384/35; 52/118; 212/350, 348, 230, 231

[56] References Cited

U.S. PATENT DOCUMENTS

D. 299,079 12/1988 Bernabe, Jr. ............................. D34/36
D. 299,179 12/1988 Bernabe, Jr. ............................. D34/36
2,949,692 8/1960 Kuhn ..................................... 52/118 X
3,481,490 12/1969 Eiler ....................................... 212/350
3,708,037 1/1973 Sterner ..................................... 52/118
3,931,698 1/1976 Ebersold .................................. 52/118
3,985,234 10/1976 Jouffray ................................. 212/350
4,045,936 9/1977 Sterner ................................. 52/118 X
4,168,008 9/1979 Granryd ................................. 212/144
4,337,601 7/1982 Vaerk et al. .............................. 52/118
4,459,786 7/1984 Pitman et al. ............................ 52/115
5,624,047 4/1997 Chalberg et al. ..................... 384/35 X

FOREIGN PATENT DOCUMENTS 2113835 6/1972 France .
2560864 9/1985 France .
94 02 692 U 5/1994 Germany .
WO9516145 6/1995 WIPO .

*Primary Examiner*—Thomas R. Hannon

[57] ABSTRACT

A jib bearing assembly for at least two relatively movable telescopic parts of a jib for a crane includes embossments formed on at least one of the telescopic parts and cooperating bearing surfaces on the other part. The bearing assemblies are disposed in high stress and load regions of the cross-sectional configuration of concentric telescoping sections of the jib.

17 Claims, 8 Drawing Sheets

TELESCOPIC JIB BEARING ASSEMBLY WITH EMBOSSMENTS

BACKGROUND OF THE INVENTION

1. Field of the Invention

The present invention relates to a telescopic jib bearing assembly including at least two telescopic parts, hollow in cross-section, for a telescopic jib correspondingly configured, and a mobile crane having such a telescopic jib bearing assembly.

2. Description of the Prior Art

Telescopic jibs, for example those of fixed or mobile cranes, are made up of several telescoping parts which can be extended for lengthening the jib. The telescopic parts particularly in the case of telescopic cranes are nested such that the inner telescopic part slides on bearing elements in a collar or on the inner wall of the outer telescopic part.

Conventionally optimized jib sections are dimensioned in the overlapping, highly shear-stressed region according to buckling stability criteria. In the case of larger cross-sections either longitudinal strips, transverse strips or localized thicker plates are employed. Additional reinforcements are often necessary in the force application zone between the inner telescopic part and the collar or the outer telescopic part. Side guides are necessary in ensuring the side straightness of the jib as a whole.

Broadly known from U.S. Design Pat. Des. 299,079 and Des. 299,179 are telescopic jibs having embossments and transverse strips, these embossments and transverse strips being distributed on the full length of the telescopic parts.

The telescopic jib bearings as cited above in accordance with related art feature in the force application zone and overlapping portion of two telescopic parts, low stability or can only be rendered stiff to buckling by complicated design. Also the lateral guidance and the orientation of the telescopic parts relative to each other is either deficient or can only be achieved by complicated design.

SUMMARY OF THE INVENTION

The object of the present invention is to provide a telescopic jib bearing assembly for a telescopic jib on a mobile crane incorporating these elements which obviates the above-cited drawbacks of related art. More particularly, the invention relates to improvements for the stability of the inner telescopic part; improvements in force application in overlapping portions as well as the guidance; and to facilitate orientation of the jib.

These objects are achieved in accordance with the invention by providing a telescopic jib bearing assembly for at least two telescopic parts, hollow in cross-section, comprising: embossments formed on at least one of the telescopic parts, at least in overlapping portions of the two telescopic parts, said embossments having convexities on one surface of the at least one telescopic part and the opposite surface thereof may be either concave or flat; and bearing surfaces on one surface of the two telescopic parts in the overlapping portion for engaging the convexities of the other telescopic part in a sliding telescopic fashion. If one side is convex, and the other side flat, then there must be two plates.

The term "embossment," as used herein is defined as a preferably integrally formed, three-dimensional shape, in a telescopic shell having a convexity on one surface of the shell and a concavity, or flat on the opposite surface thereof. If the surface opposite to the concavity is a flat region, then the plate is doubled and the gap in between is either empty or filled with foam. The embossment may be molded, cast, forged, stamped, welded, or maintained in any other suitable way.

Low dead weight is of considerable importance in the case of a telescopic jib. As compared to conventional jibs a bearing assembly in accordance with the present invention makes it possible to design shorter overlapping lengths and to eliminate the need for reinforcement plates or additional strips, the embossments in the overlapping portion endowing the telescopic part namely at this location with high dimensional stability so that such additional means of stabilization are superfluous.

It is of advantage that the invention also enables the work involved in erecting the jib part to be considerably reduced since now additional welding work is no longer required.

In one preferred embodiment of the present invention the convexities of the embossments are oriented outwardly on the inner telescopic part, and due to this configuration the inner telescopic part is supported at the sliding locations in the outer telescopic part by the formed embossments. For this reason, it cannot buckle further even under very high loads. Such a preformed jib cross-section having precisely defined additional bearings is able to satisfy the stability criteria demands without additional reinforcement. The lateral guiding response and orientation of the jib as a whole is improved since the embossed shape is more strongly supported by the sliding locations of the outer telescopic part when the load is increased.

Providing sliding elements or slippers in the overlapping portion on the inner side of the outer telescopic part is of advantage in a jib bearing as assembly in which embossments are arranged in the region of the sliding elements. Satisfactory sliding of the telescopic parts is particularly assured when such sliding elements are arranged as longitudinal strips axially on the inside of the outer telescopic parts. Since the embossments in accordance with the invention are the radially outermost locations of the inner telescopic part in the overlapping portion, they naturally come into contact with the sliding elements which thereby serve both as a counter-pressure element in preventing buckling and as guide and sliding elements.

In one aspect of the telescopic jib bearing in accordance with the invention suitable for a crane jib, the embossments on the inner telescopic part are provided on the collar of the outer telescopic part. The collar configured on the end sections of the telescopic parts of the crane serves to slidably mount the inner telescopic part next in sequence, it forming more particularly a part of the overlapping zone of the two telescopic parts in the extended condition. The embossments formed in accordance with the invention on the inner telescopic part are thus to be arranged to advantage where the inner telescopic part is mounted in the collar portion of the outer telescopic part. However, they may also extend into the overlapping portion about the collar and, more particularly, over the full length of the telescoping part, since in telescoping loads it is almost the full telescoping length which may also be the overlapping length.

It is of advantage when the embossments are provided on the inner and outer telescopic part so that each supports the other.

The embossments in accordance with the invention may be shaped as spherical calotte shells, shallow cones or elongated beads, more particularly, slanting relative to the telescopic side part. When the embossments are configured as such beads they can each be provided in operative engagement on the inner and outer telescopic part so that they intersect each other.

In one preferred embodiment of the telescopic jib bearing in accordance with the invention the telescopic parts feature, cross-sectionally, an upper semi-box shaped section, the embossments then being provided on the vertical side parts, it being in this position that the embossments can be simply produced consistently in the required length. Forming the embossments in the upper semi-box on the vertical side parts also offers a favorable sliding and guiding bearing arrangement for the upper portion of the telescopic part cross-section.

Embossments of the inner telescopic parts in accordance with the invention may also be formed in the lower cross-sectional portion of the telescopic part cross-section, thus being in portions which need to always overlap. Especially in the region of the collar of the outer telescopic part in which the force is applied, that transverse load and shear can thus also be effectively supported.

In accordance with a further aspect the present invention the telescopic jib is particularly suitable for application in a mobile crane. One such telescopic jib comprises a base part swivable on a carrier, at least one extensible telescopic part as well as a mechanism for extending and retracting each telescopic part. In accordance with the invention one such telescopic jib comprises a telescopic jib bearing assembly as described above in various variants.

One embodiment of a telescopic jib in accordance with the invention is characterized by the base part and/or at least one of the telescopic parts comprising a lower cross-section consisting of at least two, preferably three, juxtaposed shell segments, each of which features an outwardly curved shape.

It is due to this configuration of the lower profile part that good load application and stability response is combined to advantage with the high stiffness of the bearing part provided with the embossments in accordance with the invention, the buckling response permitting even further improvement by the resulting kinks at the lower shell segment edges. By shaping each of the individual shell segments curved outwardly the load application response is improved in particular.

A further advantageous effect afforded by the curved shell segments is that due to this shape more material of the cross-section, more particularly, the buckling locations, is spaced further away from its gravitational axis which in turn enhances the stiffness and stability of the profile. Accordingly, the resistance to buckling of a telescopic jib configured as such is again enhanced also in the region of the overlapping zones.

In accordance with one advantageous embodiment of the telescopic jib in accordance with the invention the curved shell segments are configured as circular arcs, whereby more particularly at least a few of the shell segments have the shape of a circular arc having differing radii, an approximate circular arc shape having a good load application response. To be able to produce shell segments having differing circular arc curvatures, the segments of the circular arc shells may feature radii differing from each other. For producing symmetrical profiles each of the circular arc shell segments arranged mirror-inversely relative to the longitudinal centerline will have the same radius.

The number of the shell segments to be used depends, on the one hand, on the desired shape of the jib and, on the other, on the loading case involved, whereby two, three or more shell segments may be employed.

The invention relates furthermore to a mobile crane having one of the variants of a telescopic jib bearing or including a telescopic jib as described above.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
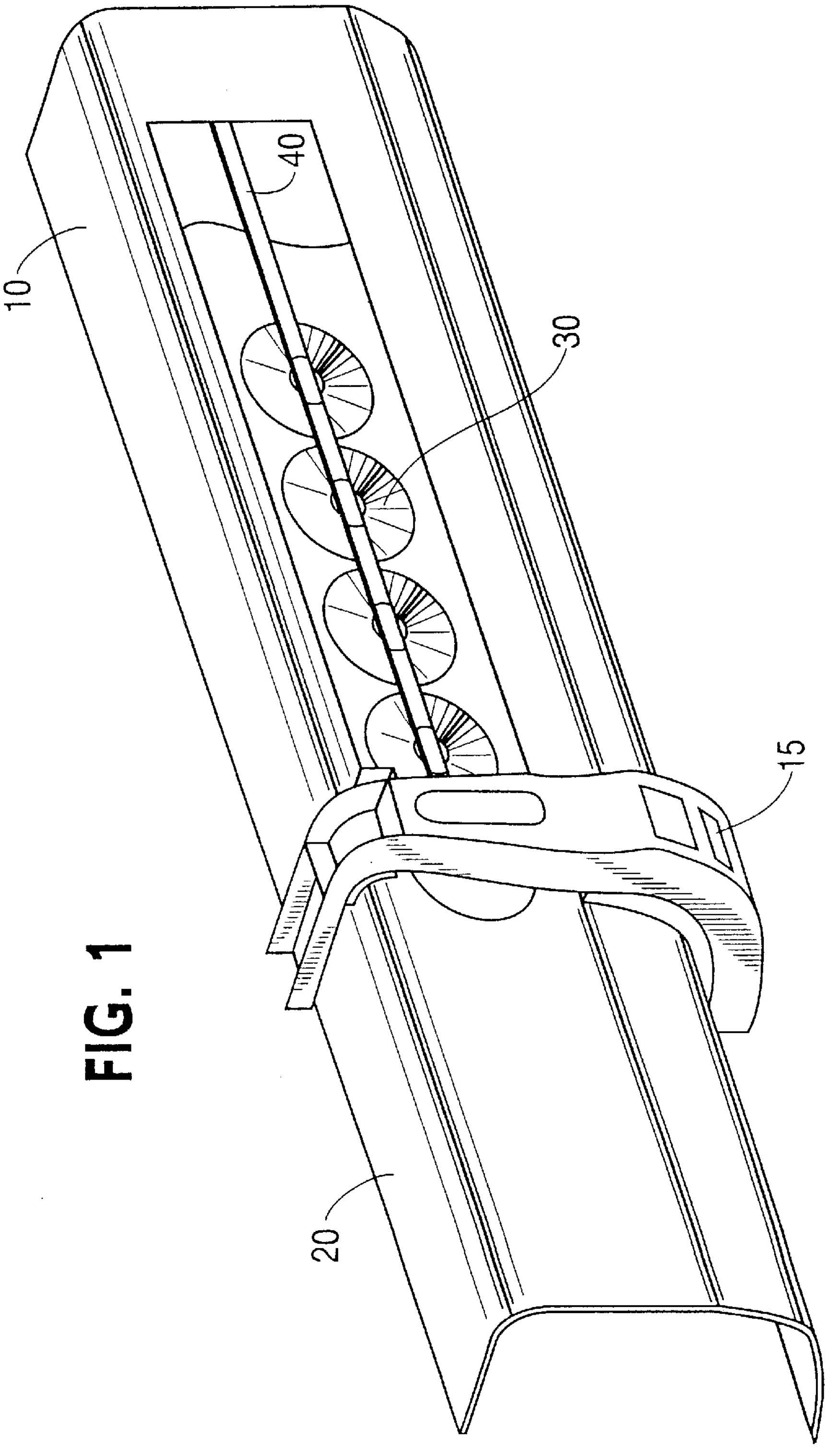
FIG. 1 is a perspective semi-sectional view of a connecting location of a telescopic part on a crane jib configured in accordance with the invention.

Referring now to FIG. 1 there is illustrated an embodiment of the telescopic jib bearing assembly in accordance with the invention by way of a crane jib as an example. The inner telescopic part 20 is mounted in the outer telescopic part 10 comprising at its front end a collar 15. The overlapping portion of the two telescopic parts 10 and 20 is located between the collar of the outer telescopic part and the foot of the inner telescopic part. Part of the outer telescopic part is not shown so that the embossments 30 and the sliding element or slipper 40 are better evident.

In the upper portion of the side part oriented vertically downwards of the inner telescopic part 20 the embossments 30 in accordance with the invention are formed and juxtaposed longitudinally.

Several embossments 30 are provided, and formed in sequence, so that embossments 30 exist in the collar and in the overlapping portion. Thus, on further extension of the inner telescopic part 20 at least one embossment is formed, in this case, in the collar portion. The sliding element 40 secured in the overlapping portion on the inside of the collar 15 or on the outside of the telescopic part 10 is mounted longitudinally in the form of a slider band, level with the largest protuberance of the embossments 30.

Figure 1A:
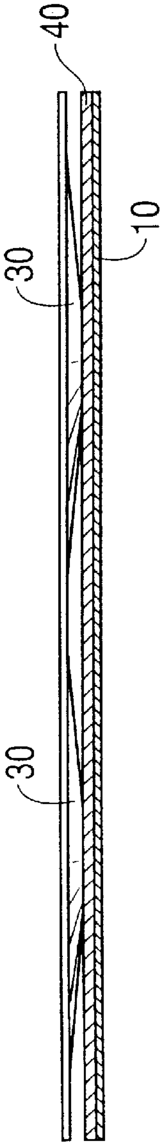
FIG. 1*a* is an explanatory partial section in the region of the embossments formed in FIG. 1.

For further details reference is made to a longitudinal section through the outer telescopic part 10 shown in FIG. 1*a*, illustrating the sliding element 40 mounted thereto and two embossments 30 formed thereon, from which it is clearly evident that the embossments have convexities which are configured as very shallow cones which are able to slide over the sliding element 40 by their relatively obtuse apexes.

Figure 2:
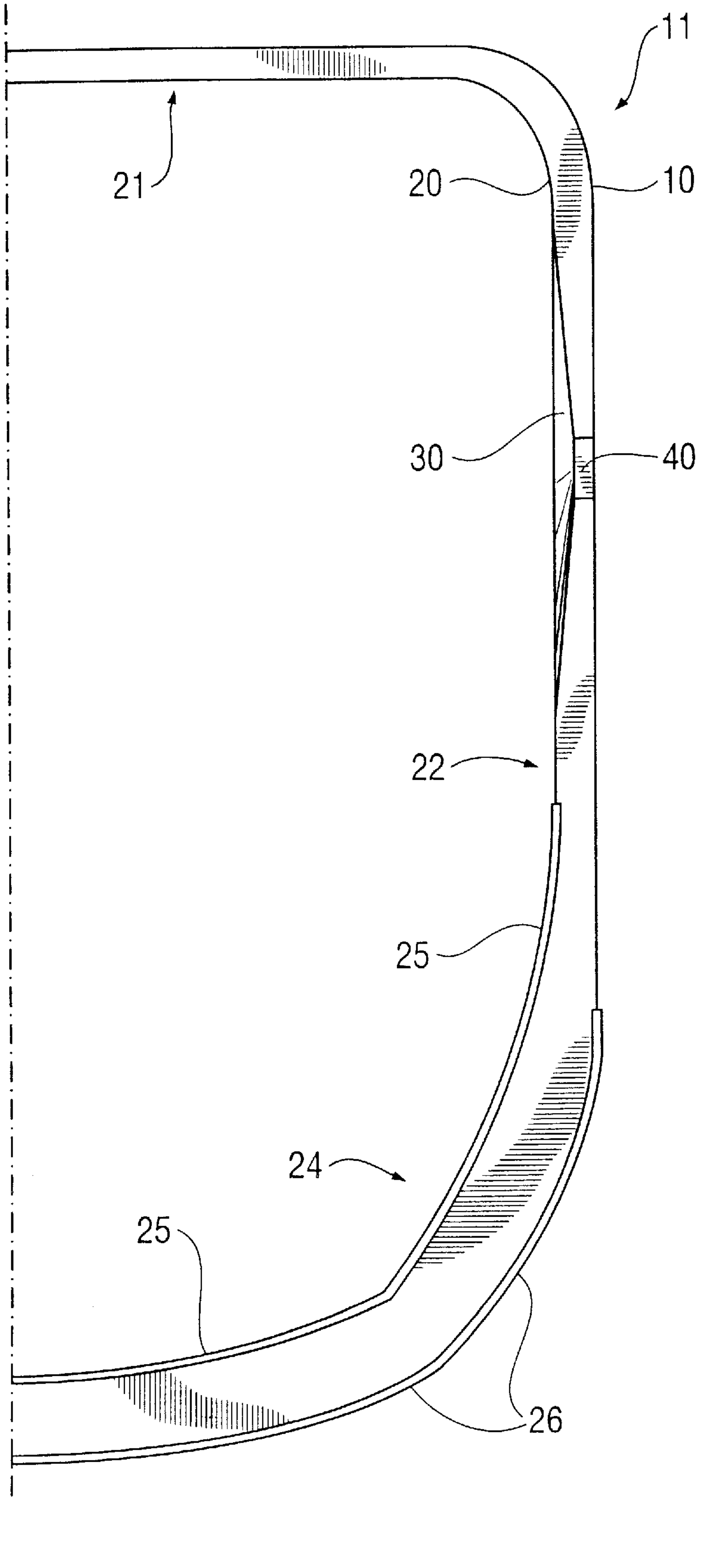
FIG. 2 is a semi-cross-section through the overlapping portion of two telescopic parts at a position adjacent to a formed embossment.

Referring now to FIG. 2 there is illustrated a cross-section through one such bearing in accordance with the invention. This cross-section is disposed at a position between two formed embossments 30 so that the embossment 30 formed on the inner telescopic part 20 is fully evident. In FIG. 2 the reference numerals 10 and 20 designate the outer telescopic part and inner telescopic part, respectively. In this case the bearing shown will be detailed with respect to the telescopic parts, 10, 20 which comprise an upper semi-box shaped section 11, 21. Formed on the vertical side part 22 of the inner telescopic part 20 in accordance with the invention is the embossment 30 extending as a shallow cone outwardly and in contact with the sliding element 40 by its largest protuberance. The sliding element 40 is in turn mounted on the outer telescopic part 10 at the vertical side part, internally.

FIG. 2 shows a section in the overlapping portion of the two telescopic parts 10, 20 not located in the collar, this being the reason why no further bearings are evident at this location.

The stabilizing function of the embossments 30 will now be explained with respect to the illustrations on a magnified scale in FIGS. 3, 3A, 3B and 3C. These Figures illustrate sections in the overlapping portion at the location of the largest protuberance of the formed embossment 30.

The embossment 30 is able to enhance stability simply by its presence, it also having the effect, however, that the cross-section of the inner telescopic part 20 can only buckle outwardly, but never inwardly, at these locations when subjected to a buckling load in the upper semi-box shaped section 21. However, such a tendency to buckle is even further prevented by the design as shown in FIGS. 2, 3, 3A, 3B and 3C in which the embossments can be formed to lean against the wall of the outer telescopic part via the sliding element 40. Due to this further means of stabilization buckling can be avoided in the overlapping portion. Additional bearing locations materialize so that the required stability can be attained without the need for additional reinforcements.

Figure 3:
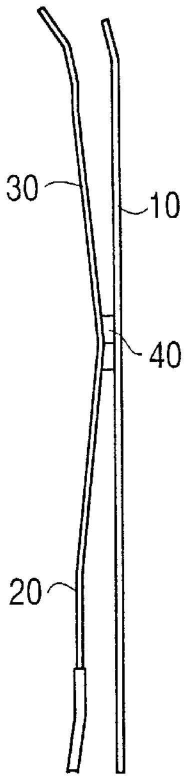
FIG. 3 is a cross-sectional view on a magnified scale in the overlapping portion at the position of the maximum protuberance of a formed embossment.
Figure 3A:
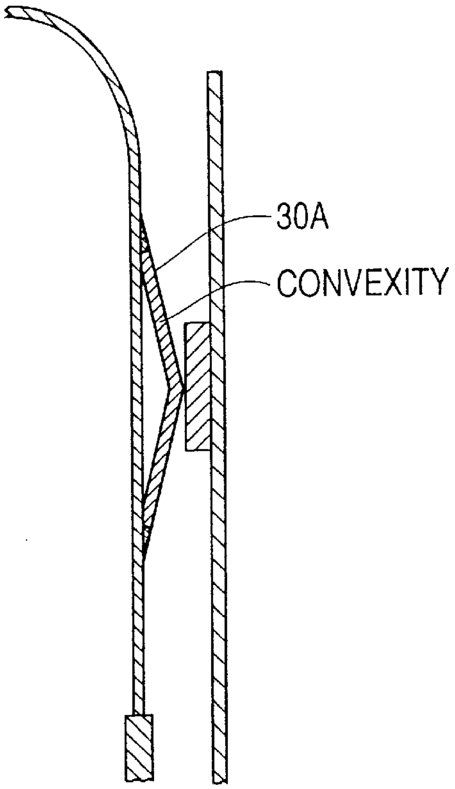
FIG. 3A is an enlarged cross-sectional view similar to the view of FIG. 3 showing another embodiment of the convexity wherein the convexity is welded onto a flat plate region of the inner telescopic part.
Figure 3B:
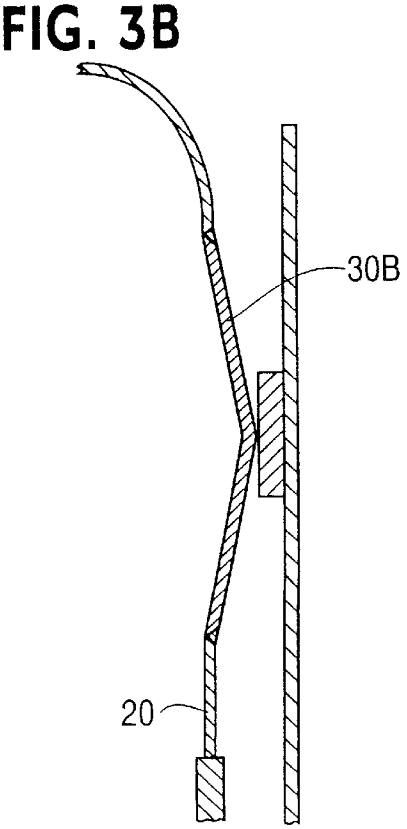
FIG. 3B is an enlarged cross-sectional view of still another embodiment of a convexity which is a separate part welded into an aperture in the wall of the inner telescopic part.
Figure 3C:
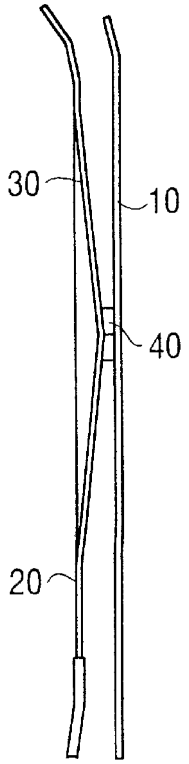
FIG. 3C is an enlarged cross-sectional view of yet another embodiment of an embossment with the concave side filled with reinforcing material such as foamed material.

The enlarged cross-sectional view of FIG. 3 shows one form of the convexity of an embossment. FIGS. 3A, 3B and 3C show other embodiments.

In FIG. 3A the convexity 30A is a separate piece welded to a flat plate region of the inner telescopic part 20.

In FIG. 3B the convexity 30B is a separate piece welded into an opening in inner telescopic part 20.

In FIG. 3C convexity 30C is reinforced in the concave cavity on its rear side with foamed or solid filler material.

A further aspect of the invention is evident from the lower cross-section of the jib design as shown in FIG. 2. The base part or the telescopic parts of a telescopic jib may comprise the lower cross-sectional structure as described in the following description which enhances stability even further.

The lower cross-section 24 of the jib structure as shown in FIG. 2 is made up of juxtaposed shell segments. The inner telescopic part 20 comprises two such shell segments 25 whilst for the outer telescopic part 10 the two shell segments 26 are illustrated.

The shell segments 25, 26 feature an outwardly curved shape, namely a circular arc. The lower zone of the telescopic parts configured as such is preferably longitudinally welded to the upper semi-box shaped section 11, 21.

Such shell segments curved outwardly in a circular arc are of major advantage in the load application zone, the resulting edges contributing towards the stiffness under buckling. Together with the aforementioned embossed structure of the upper section 11, 21 of the telescopic jib a greatly improved overall stiffness under buckling is achieved in this case.

Figure 4:
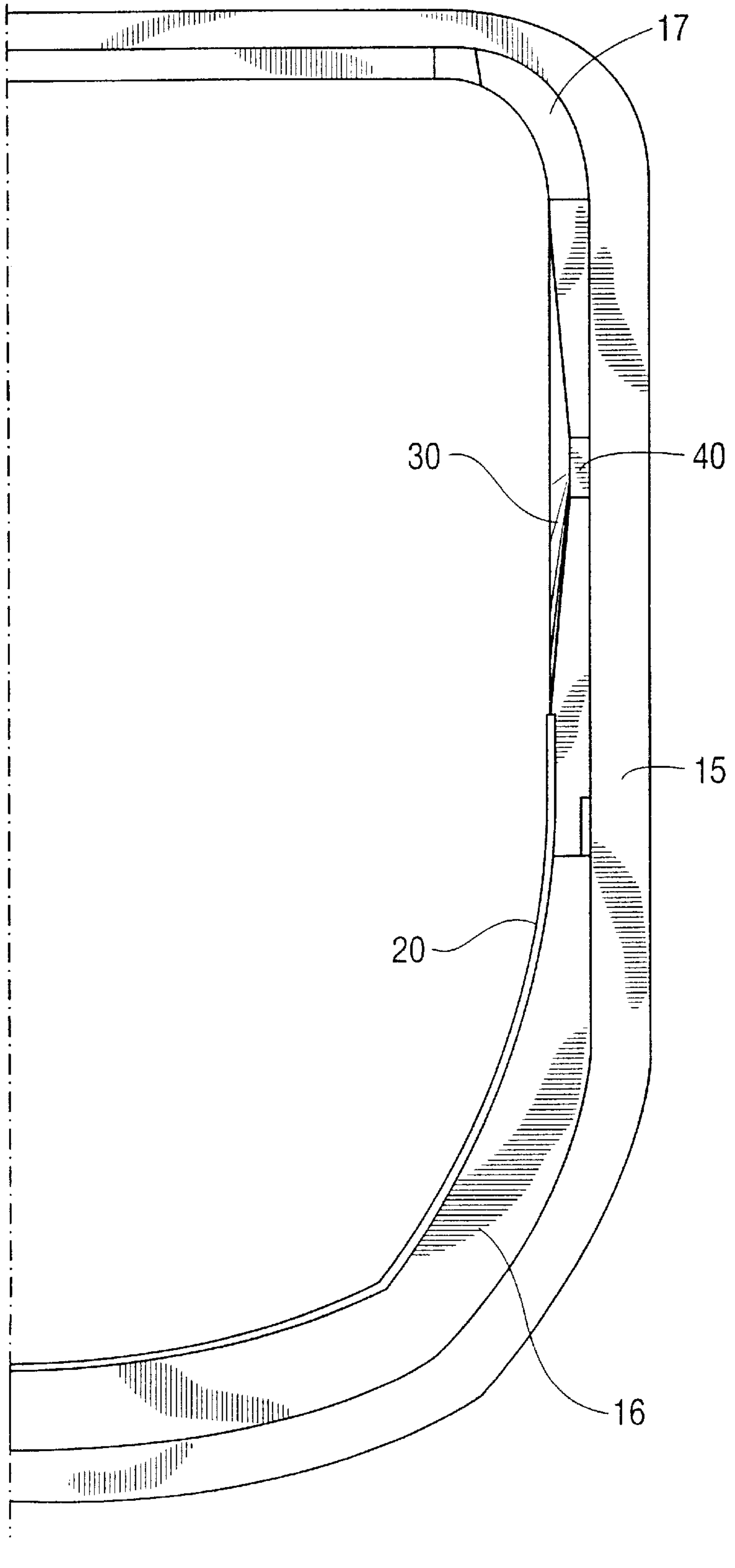
FIG. 4 is a semi-cross-section of the overlapping portion through the collar of an outer telescopic part at a position adjacent to a formed embossment.

Referring now to FIG. 4 there is illustrated a cross-section through a telescopic jib bearing assembly in accordance with the invention in the region of the collar. In this case it is the collar 15, in which the inner telescopic part 20 is mounted, is shown as the outermost component. This bearing arrangement in the collar 15 serves to handle or receive all resulting forces and comprises the sliding elements 16 provided in the lower portion of the collar 15 between it and the inner telescopic part 20, as well as in the upper corner portions the sliding elements 17.

The cross-section as shown in FIG. 4 is also located spatially adjacent to the embossments 30 so that one thereof is evident as a whole in the upper side part portion of the inner telescopic part 20. As is evident from FIG. 2, in this case too, the support of the embossments 30 formed on the inner wall of the collar 15 by the sliding element 40 is discernible, and here too, this embossment 30 as well as the support contribute towards enhancing stability as far as the buckling strength is concerned.

Figure 5:
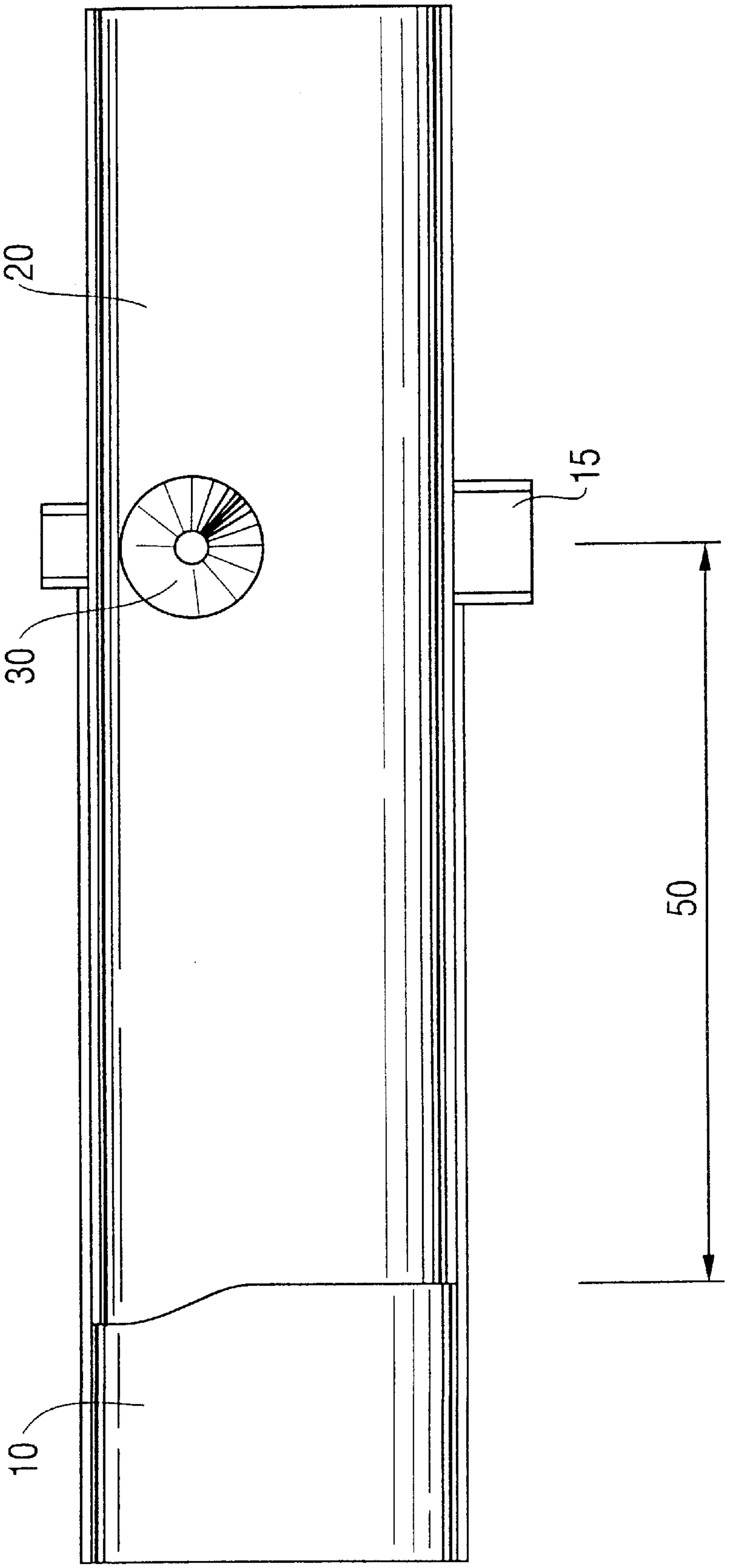
FIG. 5 is a side view of the overlapping portion of a telescopic jib bearing in accordance with the present invention.

Referring now to FIG. 5 there is illustrated the portion of the outer telescopic part 10 overlapping the inner telescopic part 20. Only one embossment 30 is shown in FIG. 5 representative for all possible arrangements thereof, this embossment being located in the overlapping portion 50 in the collar.

Figure 6:
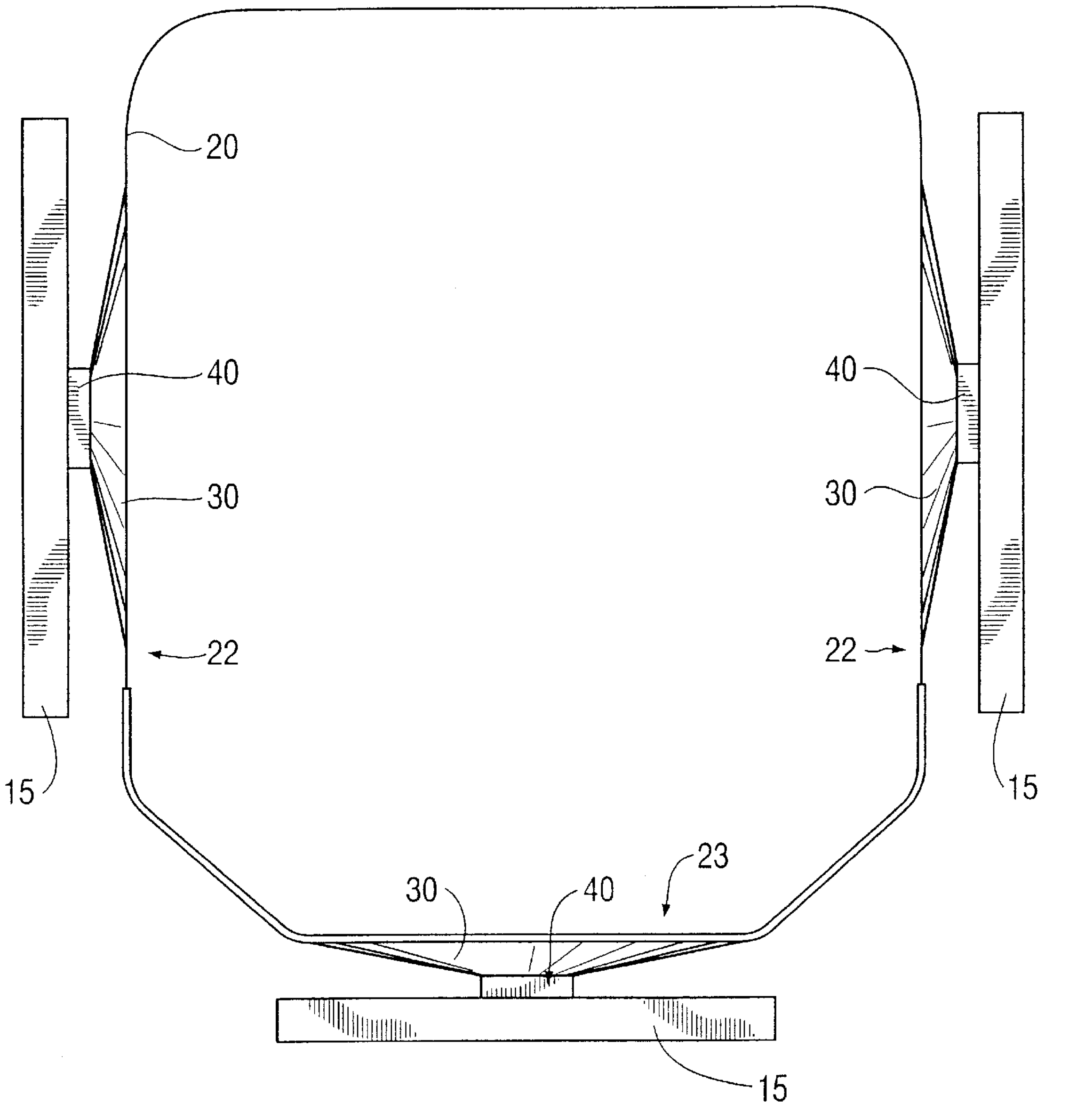
FIG. 6 is a cross-section of a telescopic jib bearing having embossments in the lower jib cross-section.

Referring now to FIG. 6 there is illustrated a further embodiment of the present invention in a cross-sectional representation, this FIG. 6 showing in turn a cross-section in the collar portion, the collar 15 thereby being shown in part only at the locations important to explaining the arrangement. In the embodiment as shown in FIG. 6 the inner telescopic part 20 comprises on both the vertical side surface areas and on its lower part embossments 30 formed slidably mounted via sliding elements 40 on the collar 15, i.e. a further bearing possibility being available by arranging the embossment 30 on the lower part of the cross-section.

As evident from FIG. 6 the lower cross-section is formed by a flat arrangement of segments. Such an embodiment including embossments 30 and sliding elements 40 on the lower cross-section is, of course, also possible in the case of shell segments configured circularly in the lower cross-section portion as is evident, for example, from FIGS. 2 and 4.

Figure 7:
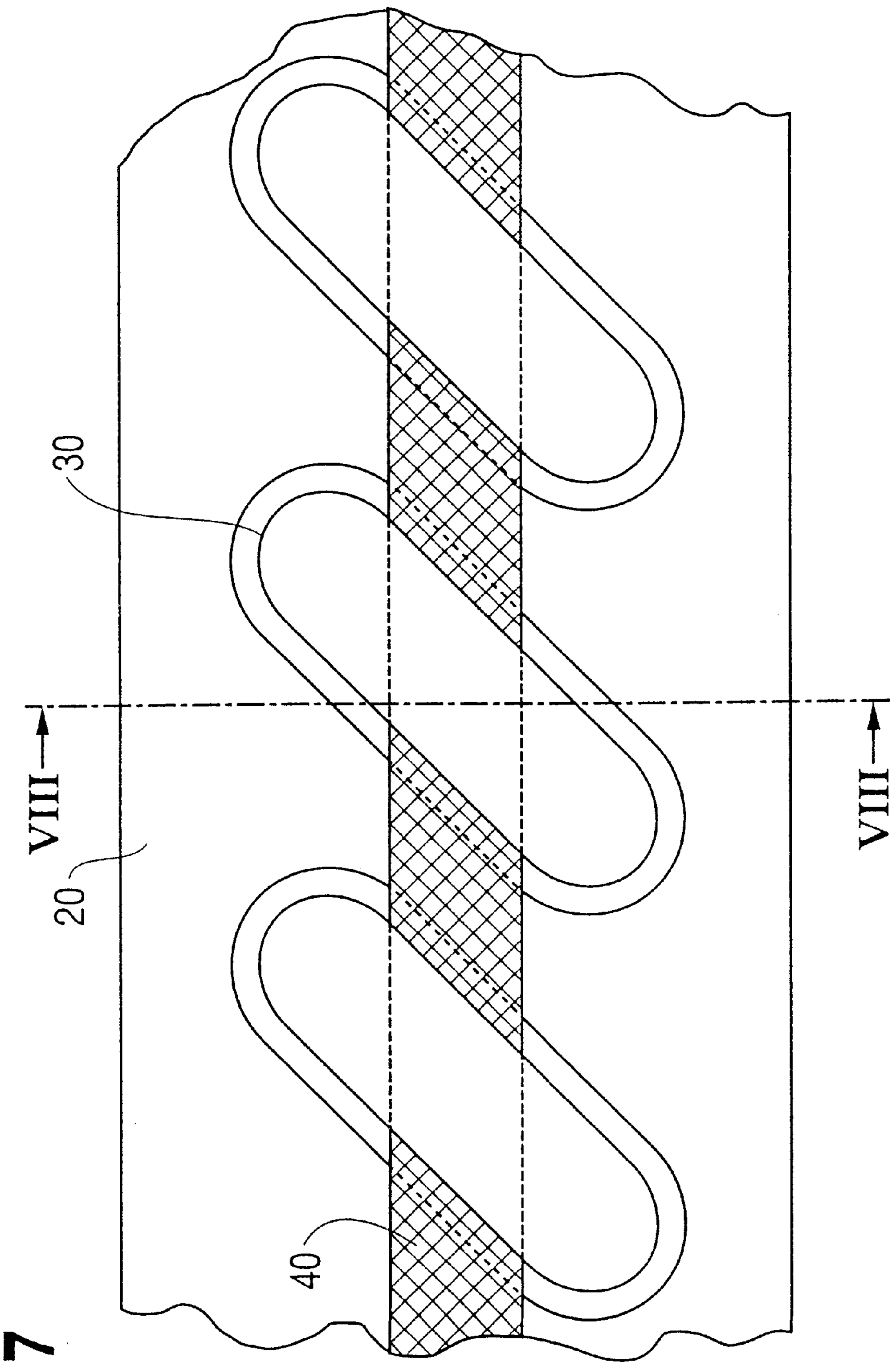
FIG. 7 is a side view of a telescopic part having a slanting arrangement of elongated beads formed as embossments.
Figure 8:
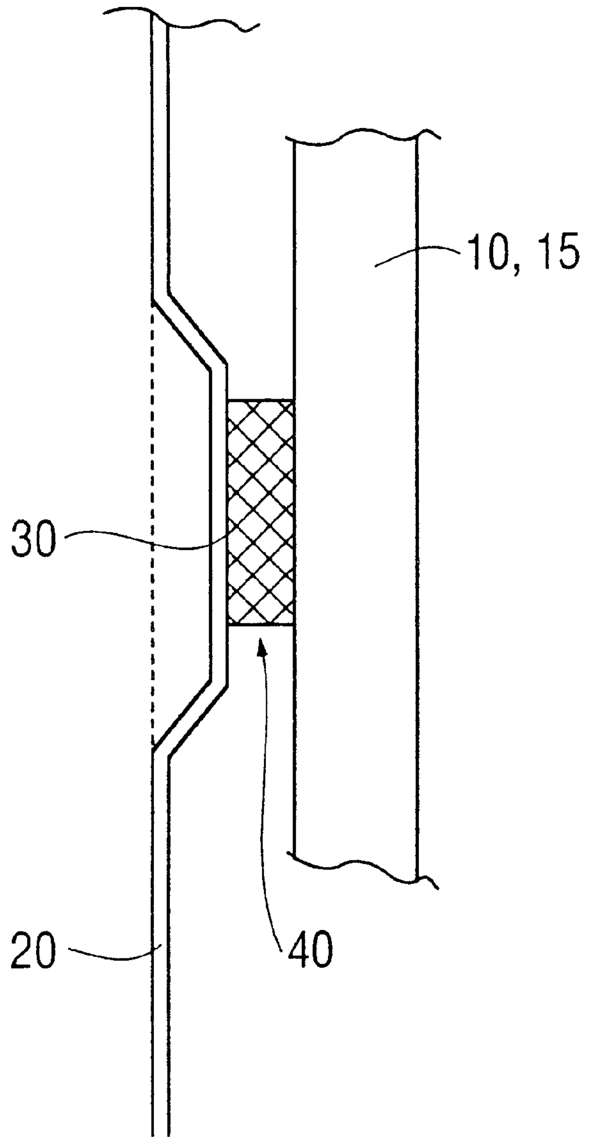
FIG. 8 is a cross-section through the telescopic part as shown in FIG. 7, taken along the section plane VIII—VIII.

The embossments 30 of the telescopic parts must not necessarily be formed as shallow cones. As already mentioned above, a spherical callote shell shape is also conceivable as well as slanting longitudinally spaced beads as shown in the side view in FIG. 7. The telescopic part section 20 as shown in FIG. 7 is arranged this time in the overlapping portion of two telescopic parts. As evident from FIG. 8 representing a partial cross-section taken long the location VIII—VIII in FIG. 7, the longitudinally spaced beads form embossments oriented outwardly at the locations where the sliding band 40 is arranged. In this case too, these embossments support the inner telescopic part 20 via a sliding element 40 on the outer cross-section formed by an outer telescopic part 10 or a collar 15.

The embossments may be formed on the inner and outer telescopic part so that each supports the other; when the beads are configured on the inner and outer telescopic part they are provided to advantage so that they intersect in each case.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A telescopic jib bearing assembly for at least two telescopic parts, hollow in cross-section, comprising:

embossments formed on at least one of the telescopic parts, at least in overlapping portions of the two telescopic parts, said embossments having convexities on one surface of the at least one telescopic part and concavities on an opposite surface thereof; and bearing surfaces on one surface of the two telescopic parts in the overlapping portion for engaging the convexities of the other telescopic part in a sliding telescopic fashion.

2. The telescopic jib bearing assembly of claim 1, wherein embossments are provided on an inner one of the two telescopic parts with the convexities disposed on an outside surface thereof for engaging bearing surfaces on an inside surface of the outer telescopic part.

3. The telescopic jib bearing assembly of claim 1 wherein, embossments are provided on an outer one of the two telescopic parts with the convexities disposed on an inside surface thereof for engaging bearing surfaces on an outside surface of the inner telescopic parts.

4. The telescopic jib bearing assembly of claim 1 wherein, embossments are provided on both the inner and outer telescopic parts with the convexities thereof engaging bearings on the opposed surface of the other of said telescopic parts.

5. The telescopic jib bearing assembly of claim 1, further including a collar surrounding the outer telescopic part in the overlapping portion, said embossment, being provided on either the outside surface of the inner telescopic part or an inside surface of the collar, the other one of said inner telescopic part or the collar having bearing surfaces for engaging the convexities of the embossments.

6. The telescopic jib bearing assembly of claim 1, wherein said telescopic parts comprise in cross-section an upper substantially box-shaped section and a lower substantially curved section connected thereto, said embossments being provided on vertical side parts of the upper box-shaped section.

7. The telescopic jib bearing assembly of claim 6, wherein embossments are also provided on the lower curved section of the telescopic parts.

8. The telescopic jib bearing assembly of claim 7, wherein the curved section is circular and includes segments of differing predetermined radii.

9. The telescopic jib bearing assembly of claim 1 wherein said embossments include elongated beads slantingly oriented to a longitudinal axis of the telescopic parts.

10. The telescopic jib bearing assembly of any of claim 1 wherein said embossments are conical.

11. The telescopic jib bearing assembly of claim 1 wherein said embossments are spherical.

12. The telescopic jib bearing assembly of claim 1 wherein the embossments are from a group of shapes consisting essentially of elongated bead shapes, conical shapes or spherical shapes.

13. The telescopic jib bearing assembly of claim 1 wherein the convexity is a separate piece of material welded to a flat plate region of the inner telescopic part.

14. The telescopic jib bearing assembly of claim 1 wherein the convexity is a separate piece of material welded into an opening in a wall of the inner telescopic part.

15. The telescopic jib bearing assembly of claim 1 wherein the concavity on the opposite side of the convexity is filled with a reinforcing material.

16. The telescopic jib bearing assembly of claim 15 wherein the reinforcing material is foamed.

17. The telescopic jib bearing assembly of claim 15 wherein the reinforcing material is solid.

* * * * *